April 9, 1935.  H. O. ROOSENSTEIN  1,997,084
REGENERATIVE TUBE GENERATOR

Filed April 2, 1931

INVENTOR
HANS OTTO ROOSENSTEIN
BY
ATTORNEY

Patented Apr. 9, 1935

1,997,084

UNITED STATES PATENT OFFICE 1,997,084

REGENERATIVE TUBE GENERATOR

Hans Otto Roosenstein, Berlin, Germany, assignor to Telefunken Gesellschaft für Drahtlose Telegraphie m. b. H., Berlin, Germany, a corporation of Germany Application April 2, 1931, Serial No. 527,193
In Germany April 3, 1930

10 Claims. (Cl. 250—36)

The frequency-stabilizing influence of an oscillation circuit on a generator or oscillator tube resides in the main in the marked dependence of the phase of both current and potential of a circuit oscillating in the neighborhood of the resonance point upon the frequency. Any frequency change caused, for instance, by alterations of the operating potential and properties of the generator tube, or by changes in the impedance of the connecting leads carrying radio frequency energy, disturbs the phase equilibrium between generator and oscillation circuit so that the frequency change as a result is in major part neutralized. The lower the damping of the oscillation circuit, the greater the change in the phase, in the presence of a definite departure of the generator oscillations from the natural period of the generator oscillations and as a consequence also the stabilizing effect thereof. The latter, however, would be so much greater if it were possible to intensify or increase the phase change of a given circuit by some sort of phase amplifier to a multiple of the original value.

Figure 1:
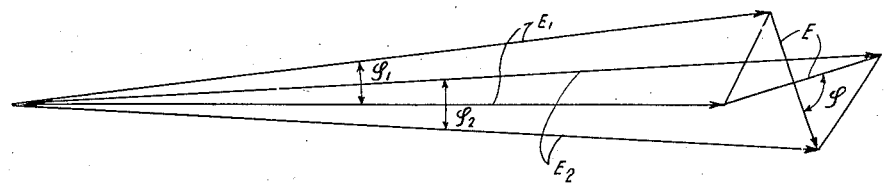
Figure 3:
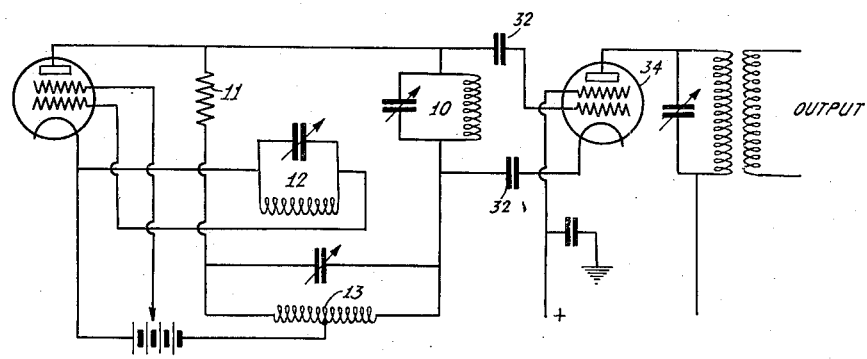
Figure 4:
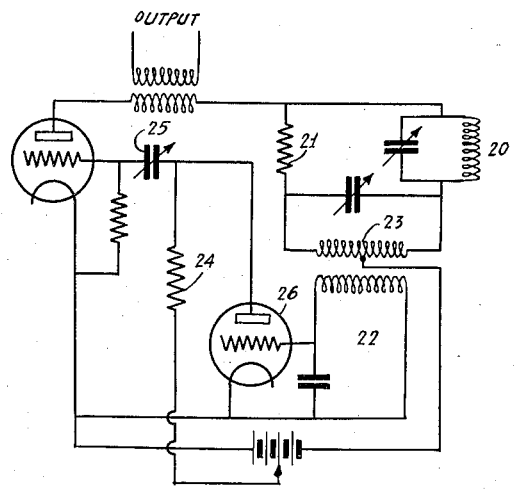
Figure 2:
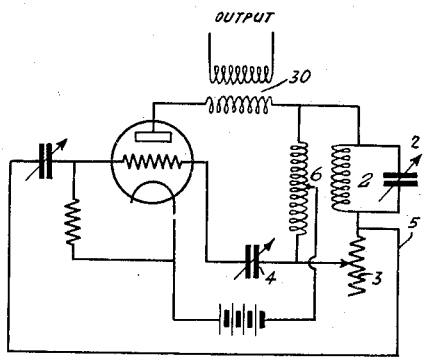

In the accompanying drawing which is given solely by way of illustration of the present invention, Figure 1 is a vector diagram explaining the operation of the present invention, and, Figures 2, 3 and 4 illustrate some embodiments of the present invention.

Now, according to the invention this end is attained by deriving the regenerative potential from the plate circuit in the form of the difference between two potentials or currents exhibiting dissimilar degrees of dependence in phase upon the frequency, with the result that the frequency dependence of the phase of the regenerating potential or current is enhanced and greater than the frequency dependence of either of the original two potentials or currents.

With the said end in view it is generally necessary that the original two potentials E1 and E2 (see Figure 1) should become neutralized. It will only then be feasible that, when E1 in the presence of a given frequency change, will turn an angle ϕ1 and E2 incidentally an angle ϕ2, there occurs a rotation or shift of phase corresponding to the difference E through an angle ϕ, and this angle is large compared with E1 and ϕ2 (see Figure 1).

The realization of this principle, therefore, is generally characterized by the use of bridge arrangements, compensator circuit schemes, and all such other circuit arrangements as are customarily used in the measuring arts based upon the null method, indeed, the only difference between the present case and the application of the idea for measuring work consists in the fact that for the present object the energy flowing in the null branch is not correctly adjusted to zero value, but is utilized for the stabilization of the frequency.

The first embodiment of the basic idea of the invention as shown in Figure 2 refers to a generator tube the plate circuit of which consists of a sort of Wheatstone bridge so that, in the presence of a certain tuned condition of circuit 2 and corresponding balancing of resistance 3, the alternating potential difference between plate lead 6 and grid lead 5 of the thermionic tube disappears. Hence, in this instance, also the grid alternating current would be zero; and no regenerative action would be present so much more so as a neutralizing condenser 4 is provided with the end in view to compensate the internal tube capacities. In order to insure regeneration, one of the bridge elements, say, the resistance 3 is slightly re-adjusted. The leads 5 will then be at a low potential the phase of which greatly depends upon the frequency, and which on the ground that it is used for regenerative coupling, insures great constancy of the oscillations. Output energy may be taken from coupling coils 30 inserted in the plate lead and fed to any suitable amplifiers, frequency multipliers or other utilization circuits.

Another circuit scheme is shown in Figure 3. The tuned differential transformer 13 is here fed with alternating current from resistance 11 and the circuit 10. If these currents are at a suitable relationship, the transformer 13 will not be caused to oscillate. In practical operation, this relationship is intentionally adjusted to a slightly different value, and the ensuing oscillation resulting therefrom in the differential transformer 13 the phase of which is greatly frequency-dependent, is back-coupled to the grid circuit 12 for the purpose of maintaining the generator oscillations. In this circuit arrangement a screen grid is provided in order to preclude undesirable regenerative coupling by way of the grid-plate capacitance. Output energy may be taken from tunable circuit 10 by means of blocking condensers 32 to a coupling tube 34 preferably of the screen grid type. The output circuit of tube 34 may be tunable as shown, and fed to any desired utilization circuit.

Now, the circuit schemes hereinbefore outlined by way of example embody this risk and disadvantage that the frequency constancy is undesirably affected by the large changes in amplitude of the back-coupled oscillations in the presence of frequency changes. In order to prevent these changes (Figure 4), regenerative relations may be established also by way of an auxiliary tube 26 which operates inside the range of maximum energy delivery and which thus functions as a load-limiter device. This tube, for example, may be in coupling relationship by way of impedance 24 with the grid condenser 25 of the main tube. It will be understood that in lieu of tube 26 also any other power-limiting means may be employed.

For best operation of the foregoing arrangements, the circuits should be made mechanically rigid and mounted so as to be free from mechanical vibration. Moreover, they should be protected against variations in ambient temperature either by inherent design, thermally controlled compensation or by control of the ambient temperature.

I claim:

1. In an oscillating audion circuit having input and output circuits, the method of stabilizing the frequency thereof over a range of frequencies which comprises feeding back from the output side to the input side a potential which is the vector sum of two nearly equal potentials whose phases vary with frequency in a pronouncedly different manner whereby the phase of said vector sum varies with frequency more rapidly than does the phase of either of said component vectors.

2. A method of stabilizing the frequency of an oscillating audion circuit by reducing the range of frequencies in which the phase of feed-back is suitable to sustain oscillations which comprises feeding back from the output side to the input side of said audion circuit a potential which is the vector sum of two nearly equal potentials whose relative phases vary with frequency.

3. An electron discharge tube oscillation generator having, in combination, input and output circuits coupled together for feed-back of energy, said coupling comprising two paths, and circuit arrangements for producing a phase shift of the feed-back energy in the said two paths such that the potentials therein differ from each other by 180 degrees at a predetermined frequency and whose relative phases vary with other frequencies.

4. In combination, an electron discharge tube oscillation generator comprising a cathode, anode, and control electrode, an inductance coil and condenser serially connecting said anode and control electrodes together, a parallel tuned circuit and a resistance connected to said tuned circuit, both of the latter being connected in parallel to said inductance, a connection from the midpoint of said inductance to said cathode, and another connection including a condenser from said control electrode to a point located between said parallel tuned circuit and said resistance.

5. In an electron discharge tube oscillation generator having a cathode, anode and control electrode, an unbalanced Wheatstone bridge arrangement, two conjugate points of which are connected to said cathode and control electrode, and the other two conjugate points of which are connected to said anode and control electrode.

6. An electron discharge tube oscillation generator having, in combination, a cathode, anode and an input circuit including a control electrode, an inductance, one end of which is connected to said anode, a source of potential in circuit with said cathode for energizing said anode, a connection from the midpoint of said inductance to said source of potential, and a parallel tuned circuit comprising a condenser and a coil connected in parallel relation to said inductance, and circuit means for coupling said inductance and said parallel tuned circuit to said input circuit for feed-back of energy.

7. In an oscillating audion circuit having input and output circuits, the method of stabilizing the frequency thereof within a small range of frequencies which comprises feeding back from the output side to the input side a potential which is the vector difference of two voltages whose relative phases vary with frequency, said two voltages being slightly but not greatly different in magnitude at a predetermined oscillation frequency, whereby the phase of said vector which is adjusted to the optimum value at the predetermined frequency changes with frequency much more rapidly than the phase of either component voltage.

8. In combination, an electron discharge tube oscillation generator comprising a cathode, anode and control electrode, an inductance coupling said anode and control electrodes together, a series circuit comprising a parallel tuned circuit and a resistance, both of which are effectively in parallel across said inductance, a connection from a point intermediate the ends of said inductance to said cathode, said inductance, parallel tuned circuit and resistance comprising an unbalanced Wheatstone bridge.

9. In combination, an electron discharge tube oscillation generator comprisng a cathode, anode, and control electrode, an inductance, a resistance and a parallel tuned circuit, one side of said inductance being connected to said anode through said resistance and the other side of said inductance being connected to said anode through said parallel tuned circuit, said inductance, resistance and parallel tuned circuit comprising an unbalanced bridge, a connection from said cathode to a point intermediate the ends of said inductance, and another inductance coupling said control electrode to said first inductance.

10. In combination, an electron discharge tube oscillation generator comprising a cathode, anode, and control electrode, an inductance, a resistance, and a parallel tuned circuit, one side of said inductance being connected to said anode through said resistance and the other side of said inductance being connected to said anode through said parallel tuned circuit, said inductance, resistance and parallel tuned circuit comprising an unbalanced bridge, a connection from said cathode to a point intermediate the ends of said inductance, an inductive connection including a limiter electron discharge device coupling said control electrode to said first inductance.

HANS OTTO ROOSENSTEIN.